United States Patent
Liu et al.

(10) Patent No.: US 11,477,307 B2
(45) Date of Patent: *Oct. 18, 2022

(54) MEDIA ACCESS CONTROL PROTOCOL DATA UNIT PROCESSING METHOD AND APPARATUS

(71) Applicant: Huawei Technologies Co., Ltd., Shenzhen (CN)

(72) Inventors: Jiwu Liu, Beijing (CN); Junren Chang, Beijing (CN); Yanbing Li, Beijing (CN); Peng Zhai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

This patent is subject to a terminal disclaimer.

(21) Appl. No.: 16/876,953

(22) Filed: May 18, 2020

(65) Prior Publication Data

US 2020/0280621 A1    Sep. 3, 2020

Related U.S. Application Data

(63) Continuation of application No. 16/554,239, filed on Aug. 28, 2019, now Pat. No. 10,686,918, which is a (Continued)

(51) Int. Cl.
*H04L 12/28* (2006.01)
*H04L 69/22* (2022.01)
(Continued)

(52) U.S. Cl.
CPC ............ *H04L 69/22* (2013.01); *H04L 69/324* (2013.01); *H04W 80/02* (2013.01)

(58) Field of Classification Search
CPC .... H04L 69/324; H04L 69/22; H04W 28/065; H04W 80/20; H04W 80/02
(Continued)

(56) References Cited

U.S. PATENT DOCUMENTS 10,374,817 B2 *  8/2019  Yi ................. H04W 76/40
10,972,939 B2 *  4/2021  Kim ............... H04W 74/08
(Continued)

FOREIGN PATENT DOCUMENTS

CN    101384020 A    3/2009
CN    102647332 A    8/2012
(Continued)

OTHER PUBLICATIONS

"Padding for NR," 3GPP TSG-RAN WG2 Meeting #99bis, Prague, Czech Republic, R2-1711581, pp. 1-4, 3rd Generation Partnership Project, Valbonne, France (Oct. 9-13, 2017).
(Continued)

*Primary Examiner* — John Pezzlo
(74) *Attorney, Agent, or Firm* — Leydig, Volt & Mayer, Ltd.

(57) ABSTRACT

A Media Access Control (MAC) protocol data unit processing method includes: obtaining a MAC protocol data unit (PDU), wherein the MAC PDU includes N sub-PDUs, each sub-PDU includes a logical channel identifier (LCID), the N sub-PDUs are arranged in a first sequence, and N is a positive integer; parsing the N sub-PDUs according to the first sequence, and when a first sub-PDU is parsed, stopping the parsing and reserving a parsed second sub-PDU, wherein the second sub-PDU includes at least one sub-PDU before the first sub-PDU in the N sub-PDUs in the first sequence, and a value of an LCID included in the first sub-PDU is a specified reserved value. In this way, a manner for processing a MAC PDU can be provided when a value of an LCID is an invalid value or a reserved value.

20 Claims, 5 Drawing Sheets

200

Obtain a MAC PDU #A — S210

Sequentially parse sub-PDUs in the MAC PDU #A based on a sequence #A, and when a sub-PDU #3 (carrying an LCID whose value is a reserved value or an invalid value) is parsed, stop parsing, and reserve a successfully parsed sub-PDU #1 (carrying an LCID whose value is a valid value) — S220

Related U.S. Application Data continuation of application No. PCT/CN2017/109216, filed on Nov. 3, 2017.

(51) Int. Cl.
    *H04J 1/16*     (2006.01)
    *H04L 69/324*     (2022.01)
    *H04W 80/02*     (2009.01)

(58) Field of Classification Search
    USPC .................................. 370/252, 329, 386, 389
    See application file for complete search history.

(56) References Cited

U.S. PATENT DOCUMENTS

| | | | |
|---|---|---|---|
| 2002/0110095 | A1 | 8/2002 | Jiang et al. |
| 2003/0177437 | A1 | 9/2003 | Wu |
| 2017/0272553 | A1 | 9/2017 | Yi et al. |
| 2018/0124637 | A1* | 5/2018 | Kim ................... H04W 52/367 |
| 2018/0206213 | A1* | 7/2018 | Kim ..................... H04W 72/04 |
| 2019/0387080 | A1* | 12/2019 | Liu ....................... H04W 72/12 |
| 2020/0275519 | A1* | 8/2020 | Sharma ................ H04W 80/02 |
| 2020/0374960 | A1* | 11/2020 | Deenoo ............ H04W 72/1284 |

FOREIGN PATENT DOCUMENTS

| | | |
|---|---|---|
| CN | 104579541 A | 4/2015 |
| KR | 20100014637 A | 2/2010 |
| KR | 20160121437 A | 10/2016 |
| KR | 20170109002 A | 9/2017 |
| WO | 2016010258 A1 | 1/2016 |
| WO | 2016163655 A1 | 10/2016 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.3.0, pp. 1-107, 3rd Generation Partnership Project, Valbonne, France (Jun. 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.4.0, pp. 1-108, 3rd Generation Partnership Project, Valbonne, France (Sep. 2017).

"Presentation of Specification/Report to TSG: TS 38.321, Version 1.0.0.," 3GPP TSG-RAN Meeting #77, Sapporo, Japan, RP-171733, pp. 1, 3rd Generation Partnership Project, Valbonne, France (Sep. 11-14, 2017).

"3rd Generation Partnership Project; Technical Specification Group Radio Access Network; NR; Medium Access Control (MAC) protocol specification (Release 15)," 3GPP TS 38.321 V1.0.0, pp. 1-46, 3rd Generation Partnership Project, Valbonne, France (Sep. 2017).

"MAC PDU discard due to unknown MAC CEs," 3GPP TSG-RAN WG2 #99bis, Prague, Czech Republic, Tdoc R2-1711166, pp. 1-2, 3rd Generation Partnership Project, Valbonne, France (Oct. 9-13, 2017).

"3rd Generation Partnership Project; Technical Specification Group Radio Access Network; NR; NR and NG-RAN Overall Description; Stage 2 (Release 15)," 3GPP TS 38.300 V1.1.1, pp. 1-63, 3rd Generation Partnership Project, Valbonne, France (Oct. 2017).

"CR to 36.321 on error handling for MBMS," 3GPP TSG-RAN WG2 Meeting #68bis, Valencia, Spain, R2-100101, pp. 1-3, 3rd Generation Partnership Project, Valbonne, France (Jan. 18-22, 2010).

"Handling of Unknown, Unforeseen and Erroneous Protocol Data," 3GPP TSG-RAN WG2 Meeting #99bis, Prague, Czech Republic, R2-1711784, pp. 1-2, 3rd Generation Partnership Project, Valbonne, France (Oct. 9-13, 2017).

"The usage of LCID field in MAC sub-header," 3GPP TSG-RAN WG2 Meeting #NR AH2, R2-1706363, Qingdao, China, Total 3 pages 3rd Generation Partnership Project, Valbonne, France (Jun. 27-29, 2017).

U.S. Appl. No. 16/554,239, filed Aug. 28, 2019.

"3rd Generation Partnership Project; Technical Specification Group Radio Access Network; NR; Physical channels and modulation (Release 15)," 3GPP TS 38.211 V1.0.0, total 37 pages, 3rd Generation Partnership Project, Valbonne, France (Sep. 2017).

"3rd Generation Partnership Project; Technical Specification Group Radio Access Network; NR; Multiplexing and channel coding (Release 15)," 3GPP TS 38.212 V1.0.0, total 28 pages, 3rd Generation Partnership Project, Valbonne, France (Sep. 2017).

"3rd Generation Partnership Project; Technical Specification Group Radio Access Network; NR; Physical layer procedures for control (Release 15)," 3GPP TS 38.213 V1.0.0, total 16 pages, 3rd Generation Partnership Project, Valbonne, France (Sep. 2017).

"3rd Generation Partnership Project; Technical Specification Group Radio Access Network; NR; Physical layer procedures for data (Release 15)," 3GPP TS 38.214 V1.0.0, total 32 pages 3rd Generation Partnership Project, Valbonne, France (Sep. 2017).

"3rd Generation Partnership Project; Technical Specification Group Radio Access Network; NR; Radio Resource Control (RRC); Protocol specification (Release 15)," 3GPP TS 38.331 V0.1.0, total 42 pages, 3rd Generation Partnership Project, Valbonne, France (Oct. 2017).

"3rd Generation Partnership Project; Technical Specification Group Radio Access Network; New Radio(NR); Requirements for support of radio resource management (Release 15)," 3GPP TS 38.133 V0.2.0, total 15 pages, 3rd Generation Partnership Project, Valbonne, France (Sep. 2017).

\* cited by examiner

MEDIA ACCESS CONTROL PROTOCOL DATA UNIT PROCESSING METHOD AND APPARATUS

CROSS-REFERENCE TO RELATED APPLICATIONS

This application is a continuation of U.S. patent application Ser. No. 16/554,239, filed on Aug. 28, 2019, which is a continuation of International Application No. PCT/CN2017/109216, filed on Nov. 3, 2017. All of the aforementioned patent applications are hereby incorporated by reference in their entireties.

TECHNICAL FIELD

This application relates to the communications field, and more specifically, to a Media Access Control protocol data unit processing method.

BACKGROUND

Currently, a technology for processing Media Access Control (MAC) protocol data unit (PDU) is known. In this technology, a MAC PDU includes a plurality of sub-PDUs, each sub-PDU carries a logical channel identifier (LCID), and a communications protocol specifies processing manners corresponding to a plurality of types of LCIDs. Therefore, each sub-PDU may be parsed based on an LCID carried in the sub-PDU.

With the development of communications technologies, releases of the communications protocol change constantly, and processing manners corresponding to LCIDs and specified in different releases of the communications protocol may be different. For example, for an LCID #α, no processing manner corresponding to the LCID #α is defined in one communications protocol release (which is referred to as a communications protocol release #1 below for the convenience of understanding and description). To be specific, for a communications device (which is marked as a communications device #1 below for the convenience of understanding and distinguishing) using the communications protocol release #1 in a network, a value of the LCID #α is an invalid value or a reserved value. In addition, a processing manner corresponding to the LCID #α is defined in another communications protocol release (which is, for example, an updated communications protocol release compared with the communications protocol release #1, and is referred to as a communications protocol release #2 below for the convenience of understanding and description). To be specific, for a communications device (which is marked as a communications device #2 below for the convenience of understanding and distinguishing) using the communications protocol release #2 in a network, the value of the LCID #α is a valid value.

In this case, when the communications device #1 communicates with the communications device #2, the communications device #2 may generate a sub-PDU carrying the LCID #α, and send the sub-PDU to the communications device #1. Because the value of LCID #α is a reserved value or an invalid value for the communications device #1, an error may occur when the sub-PDU carrying the LCID #α is parsed, and as a result, the communications device #1 cannot determine how to process an entire MAC PDU.

SUMMARY

This application provides a Media Access Control protocol data unit processing method and apparatus, to provide a manner for processing a MAC PDU when a value of an LCID is an invalid value or a reserved value.

According to a first aspect, a Media Access Control protocol data unit processing method is provided. The method includes: obtaining a Media Access Control (MAC) protocol data unit (PDU), where the MAC PDU includes N sub-PDUs, each sub-PDU includes a logical channel identifier (LCID), the N sub-PDUs are arranged in a first sequence, and N is a positive integer; parsing the N sub-PDUs according to the first sequence, and when a first sub-PDU is parsed, stopping the parsing and reserving a parsed second sub-PDU, where the second sub-PDU includes at least one sub-PDU before the first sub-PDU in the N sub-PDUs in the first sequence, and a value of an LCID included in the first sub-PDU is a specified reserved value or an invalid value.

In a Media Access Control protocol data unit processing method according to this application, the plurality of sub-PDUs in the MAC PDU are sequentially parsed, and when a sub-PDU carrying an LCID with an invalid value or a reserved value is processed, parsing the MAC PDU is stopped, and a successfully parsed sub-PDU is reserved, thereby avoiding that because a sub-PDU carrying an LCID with an invalid value or a reserved value cannot be parsed, an error occurs in parsing a subsequent sub-PDU, and ensuring that the successfully parsed sub-PDU can be used.

Optionally, the first sub-PDU is the first to have the LCID with the specified reserved value or the invalid value in the N sub-PDUs in the first sequence. Parsing the MAC PDU is stopped when a sub-PDU carrying an LCID with an invalid value or a reserved value is found for the first time, thereby further improving an effect and practicability of this application.

Optionally, the method further includes: discarding a plurality of third sub-PDUs, where the plurality of third sub-PDUs include the first sub-PDU and at least one sub-PDU after the first sub-PDU in the N sub-PDUs in the first sequence. The third sub-PDUs are discarded, thereby avoiding occupation and a waste of storage space caused by storage of the third sub-PDUs.

Optionally, the method further includes: after obtaining a MAC service data unit (SDU) by parsing a fourth sub-PDU and before the parsing the N sub-PDUs ends, sending the MAC SDU to a higher layer entity of a MAC layer entity, where the higher layer entity is an entity used to process the MAC SDU, and a value of an LCID included in the fourth sub-PDU is a specified valid value. Before parsing the MAC PDU ends, the SDU successfully parsed is sent to the higher layer entity, thereby reducing a time of occupying storage space by the SDU, and improving usage of the storage space.

Optionally, after obtaining a MAC SDU by parsing a third sub-PDU and before the parsing the N sub-PDUs ends, the sending the MAC SDU to a higher layer entity of a MAC layer entity includes: after obtaining the MAC service data unit SDU by parsing the fourth sub-PDU and before a fifth sub-PDU is parsed, sending the MAC SDU to the higher layer entity of the MAC layer entity, where the fifth sub-PDU is next to the fourth sub-PDU in the N sub-PDUs in the first sequence. After an SDU is obtained by parsing, the SDU is immediately sent to the higher layer entity, thereby avoiding occupation and a waste of storage space caused by storage of the SDU.

Optionally, the parsing includes: after obtaining a MAC control element (CE) by parsing a sixth sub-PDU and before the parsing the N sub-PDUs ends, processing the MAC CE on the MAC layer entity, where a value of an LCID included in the sixth sub-PDU is a specified valid value. Before parsing the MAC PDU ends, the CE successfully parsed is processed, thereby reducing a time of occupying storage space by the CE, and improving usage of the storage space.

Optionally, after obtaining the MAC control element (CE) by parsing the sixth sub-PDU and before the parsing the N sub-PDUs ends, the processing the MAC CE on the MAC layer entity includes: after obtaining the MAC control element (CE) by parsing the sixth sub-PDU and before a seventh sub-PDU is parsed, processing the MAC CE on the MAC layer entity, where the seventh sub-PDU is next to the sixth sub-PDU in the N sub-PDUs in the first sequence. After a CE is obtained by parsing, the CE is immediately processed, thereby avoiding occupation and a waste of storage space caused by storage of the CE.

According to a second aspect, a Media Access Control protocol data unit processing method is provided. The method includes: obtaining a Media Access Control (MAC) protocol data unit (PDU), where the MAC PDU includes N sub-PDUs, and N is a positive integer; parsing the N sub-PDUs; and after obtaining a MAC service data unit (SDU) by parsing a first sub-PDU and before the parsing ends, sending the MAC SDU to a higher layer entity of a MAC layer entity, where the higher layer entity is an entity used to process the MAC SDU; and/or after obtaining a MAC control element (CE) by parsing a second sub-PDU and before the parsing ends, processing the MAC CE on the MAC layer entity.

Before parsing the MAC PDU ends, the SDU or CE successfully parsed is processed, thereby reducing a time of occupying storage space by the SDU or CE, and improving usage of the storage space.

Optionally, the N sub-PDUs are arranged in the first sequence, and the parsing the N sub-PDUs includes: parsing the N sub-PDUs according to the first sequence.

Optionally, after obtaining the MAC SDU by parsing the first sub-PDU and before the parsing ends, the sending the MAC SDU to a higher layer entity of a MAC layer entity includes: after obtaining the MAC SDU by parsing the first sub-PDU and before a third sub-PDU is parsed, sending the MAC SDU to the higher layer entity of the MAC layer entity, where the third sub-PDU is next to the first sub-PDU in the N sub-PDUs in the first sequence. After an SDU is obtained by parsing, the SDU is immediately sent to the higher layer entity, thereby avoiding occupation and a waste of storage space caused by storage of the SDU.

Optionally, after obtaining the MAC CE by parsing the second sub-PDU and before the parsing ends, the processing the MAC CE on the MAC layer entity includes: after obtaining the MAC CE by parsing the second sub-PDU and before a fourth sub-PDU is parsed, processing the MAC CE on the MAC layer entity, where the fourth sub-PDU is next to the second sub-PDU in the N sub-PDUs in the first sequence. After a CE is obtained by parsing, the CE is immediately processed, thereby avoiding occupation and a waste of storage space caused by storage of the CE.

Optionally, each of the N sub-PDUs includes a logical channel identifier (LCID); and the method further includes: when a fifth sub-PDU is parsed, stopping the parsing, and reserving a parsed sixth sub-PDU, where the sixth sub-PDU includes at least one sub-PDU before the fifth sub-PDU in the N sub-PDUs in the first sequence, and a value of an LCID included in the fifth sub-PDU is a specified reserved value or an invalid value.

In a Media Access Control protocol data unit processing method according to this application, the plurality of sub-PDUs in the MAC PDU are sequentially parsed, and when a sub-PDU carrying an LCID with an invalid value or a reserved value is processed, parsing the MAC PDU is stopped, and a successfully parsed sub-PDU is reserved, thereby avoiding that because a sub-PDU carrying an LCID with an invalid value or a reserved value cannot be parsed, an error occurs in parsing a subsequent sub-PDU, and ensuring that the successfully parsed sub-PDU can be used.

Optionally, the fifth sub-PDU is the first to have the LCID with the specified reserved value or the invalid value in the N sub-PDUs in the first sequence. Parsing the MAC PDU is stopped when a sub-PDU carrying an LCID with an invalid value or a reserved value is found for the first time, thereby further improving an effect and practicability of this application.

Optionally, the method further includes: discarding a plurality of seventh sub-PDUs, where the plurality of seventh sub-PDUs include the fifth sub-PDU and at least one sub-PDU after the fifth sub-PDU in the N sub-PDUs in the first sequence. The seventh sub-PDUs are discarded, thereby avoiding occupation and a waste of storage space caused by storage of the seventh sub-PDUs.

According to a third aspect, a Media Access Control protocol data unit processing apparatus is provided, including units configured to perform the steps in the first aspect and the implementations of the first aspect.

Optionally, the apparatus includes a chip or a circuit, for example, a chip or a circuit that can be disposed inside a communications device (for example, a terminal device or a network device).

Optionally, the apparatus is a communications device, for example, a terminal device or a network device.

According to a fourth aspect, a Media Access Control protocol data unit processing apparatus is provided, including units configured to perform the steps in the second aspect and the implementations of the second aspect.

Optionally, the apparatus includes a chip or a circuit, for example, a chip or a circuit that can be disposed inside a communications device (for example, a network device or a terminal device).

Optionally, the apparatus is a communications device, for example, a network device or a terminal device.

According to a fifth aspect, a communications device is provided, including a memory and a processor. The memory is configured to store a computer program, and the processor is configured to invoke the computer program from the memory and run the computer program, so that the communications device performs the method in the first aspect or the second aspect and the implementations thereof.

According to a sixth aspect, a chip system is provided, including a processor. The processor is configured to invoke a computer program from a memory and execute the computer program, so that a communications device onto which the chip system is installed performs the method in the first aspect or the second aspect and the implementations thereof.

According to a seventh aspect, a computer program product is provided. The computer program product includes computer program code. When the computer program code is run by a communications unit and a processing unit or by a transceiver and a processor of a communications device (for example, a terminal device or a network device), so that the communications device performs the method in the first aspect or the second aspect and the implementations thereof.

According to an eighth aspect, a computer readable storage medium is provided. The computer readable storage medium stores a program. The program enables a communications device (for example, a terminal device or a network device) to perform the method in the first aspect or the second aspect and the implementations thereof.

By using a Media Access Control protocol data unit processing method and apparatus according to this application, a manner for processing a MAC PDU can be provided when a value of an LCID is an invalid value or a reserved value.

DESCRIPTION OF EMBODIMENTS

The following describes technical solutions in this application with reference to the accompanying drawings.

Technical solutions of embodiments of this application may be applied to various communications systems, such as: Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, Universal Mobile Telecommunications System (UMTS), a Worldwide Interoperability for Microwave Access (WiMAX) communications system, a future 5th Generation (5G) system, or a New Radio (NR) system.

The MAC PDU processing method in embodiments of the present invention may be performed by a communications device, a processor of the communications device, or a MAC layer processing entity of the communications device (or the processor of the communications device). The entity may be in a form of hardware or software. For exemplary details, refer to descriptions in the subsequent exemplary embodiments.

The communications device may be a network device or a terminal device. The terminal device may also be referred to as a user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The terminal device may be a station (ST) in a wireless local area network (WLAN), and may be a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, or a terminal device in a network in a next generation communications system, for example, a terminal device in a 5G network or a terminal device in a future evolved public land mobile network (PLMN).

By way of example but not limitation, in embodiments of the present invention, the terminal device may be a wearable device. The wearable device may also be referred to as a wearable intelligent device, and is a collective name of wearable devices, such as glasses, gloves, watches, clothes, and shoes, obtained after a wearable technology is used for intelligent design and development of daily wear. A wearable device is a portable device that can be directly worn or integrated into clothes or an accessory of a user. The wearable device not only is a hardware device, but also implements a strong function through software support, data exchange, and cloud exchange. A generic wearable intelligent device includes a wearable device with large-size and complete functions and capable of implementing all or some functions without relying on a smartphone, for example, a smart watch or smart glasses, and a wearable device concentrating on a particular type of application function and needing to be used together with another device such as a smartphone, for example, various smart bands performing vital sign monitoring, and intelligent jewelries.

Alternatively, in embodiments of the present invention, the terminal device may be a terminal device in an Internet of Things (IoT) system. IoT is an important composition part of information technology development in the future, and has a main technical feature in which things are connected to a network by using a communications technology to implement a man-machine connected and thing-thing connected intelligent network.

In embodiments of the present invention, in the IoT technology, massive connections, deep coverage, and power saving of a terminal can be implemented by using, for example, a narrow band (NB) technology. For example, an NB includes only one resource block (RB). To be specific, a bandwidth of the NB is only 180 KB. To implement massive connections, terminal access needs to be discrete. In the communication method in embodiments of the present invention, a problem of congestion caused when massive terminals access a network by using an NB in the IoT technology can be effectively resolved.

In addition, a network device may include an access network device or a core network device. The access network device may be a device configured to communicate with a mobile device. The access network device may be an access point (AP) in WLAN, or a base station (base transceiver station, BTS) in GSM/CDMA, or may be a base station (NodeB, NB) in WCDMA, or a gNB in a New Radio (NR) system, or may be an evolved base station (evolutional Node B, eNB or eNodeB) in LTE, or a relay station or an access point, or an in-vehicle device, a wearable device, an access network device in a future 5G network, or an access network device in a future evolved PLMN network, or the like.

In addition, in embodiments of the present invention, the access network device provides a service for a cell. The terminal device communicates with the access network device by using a transmission resource (for example, a frequency-domain resource or a spectrum resource) used by the cell. The cell may be a cell corresponding to the access network device (for example, a base station). The cell may belong to a macro base station, or a base station corresponding to a small cell. The small cell may include a metro cell, a micro cell, a pico cell, a femto cell, or the like. The small cells have features such as small coverage, and low transmit power, and are suitable for providing a high-rate data transmission service.

In addition, a plurality of cells may work intra-frequency on a carrier in an LTE system or a 5G system. In some special scenarios, it may be considered that a concept of the carrier is equivalent to a concept of the cell. For example, in a carrier aggregation (CA) scenario, when a secondary carrier is configured for a UE, both a carrier index of the secondary carrier and a cell identity (Cell ID) of a secondary cell working on the secondary carrier are carried. In this case, it may be considered that the concept of the carrier is equivalent to the concept of the cell. For example, that UE accesses a carrier is equivalent to that UE accesses a cell.

The core network device may be connected to a plurality of access network devices, and configured to control the access network devices, and distribute, to the access network devices, data received from a network side (for example, Internet). The foregoing listed functions and exemplary implementations of the terminal device, the access network device, and the core network device are merely described by way of example, and are not limitations with respect to the present invention.

In embodiments of the present invention, a terminal device or a network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, embodiments of the present invention do not particularly limit a specific structure of an execution body of a method provided in embodiments of the present invention, provided that a program recording code of a method provided in embodiments of the present invention can be run to implement communication according to a method provided in embodiments of the present invention. For example, the execution body of a method provided in embodiments of the present invention may be a terminal device or a network device, or may be a function module capable of invoking and executing a program in the terminal device or the network device.

In addition, aspects or features of embodiments of the present invention may be implemented as a method, an apparatus, or a product using a standard programming and/or engineering technology. The term "product" used in this application covers a computer program accessible from any computer readable component, carrier, or medium. For example, the computer readable medium may include but is not limited to a magnetic storage component (for example, a hard disk, a floppy disk, or a magnetic tape), an optical disc (for example, a compact disc (CD), or a digital versatile disc (DVD)), a smartcard, and a flash memory component (for example, an erasable programmable read-only memory (EPROM), a card, a stick, or a key drive). In addition, the storage mediums in this specification may represent one or more devices and/or another machine readable medium configured to store information. The term "machine readable medium" may include but is not limited a radio channel and various other media capable of storing, including, and/or carrying an instruction and/or data.

It should be noted that in embodiments of the present invention, a plurality of application programs may run at the application layer. In this case, an application program performing a communication method in embodiments of the present invention and an application program configured to control a receive end device to implement an action corresponding to received data may be different application programs.

Figure 1:
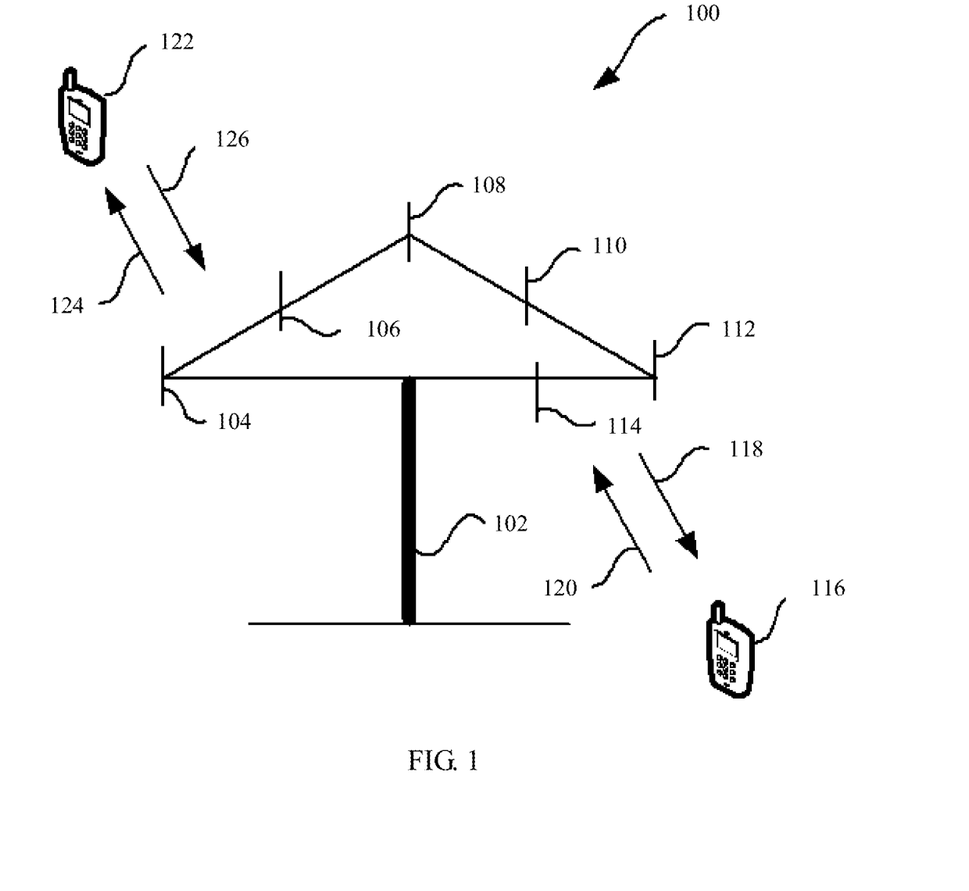
FIG. 1 is a schematic diagram of an example of a communications system according to an embodiment of the present invention.

FIG. 1 is a schematic diagram of a system 100 applicable to a communication method in embodiments of the present invention. As shown in FIG. 1, the system 100 includes an access network device 102, and the access network device 102 may include one or more antennas, for example, antennas 104, 106, 108, 110, 112, and 114. In addition, the access network device 102 may additionally include a transmitter link and a receiver link. A person of ordinary skill in the art may understand that the transmitter link and the receiver link may include a plurality of parts (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it may be understood that the access network device 102 may communicate with any quantity of terminal devices similar to the terminal device 116 or the terminal device 122. Each of the terminal device 116 and the terminal device 122 may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 through a forward link (also referred to as a downlink) 118, and receive information from the terminal device 116 through a reverse link (also referred to as an uplink) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, the forward link 118 and the reverse link 120 may use different frequency bands, and the forward link 124 and the reverse link 126 may use different frequency bands. For another example, in a time division duplex (TDD) system and a full duplex system, the forward link 118 and the reverse link 120 may use a same frequency band, and the forward link 124 and the reverse link 126 may use a same frequency band.

Each antenna (or each antenna group including a plurality of antennas) and/or area designed for communication is referred to as a sector of the access network device 102. For example, an antenna group may be designed to communicate with a terminal device in a sector in coverage of the access network device 102. The access network device may send signals to all terminal devices in a corresponding sector by using a single antenna or a multi-antenna transmit diversity. When the access network device 102 is communicating with the terminal devices 116 and 122 respectively through the forward links 118 and 124, beamforming may be used in a transmit antenna of the access network device 102, to improve signal to noise ratios of the forward links 118 and 124. In addition, compared with the manner in which the access network device sends signals to all terminal devices by using a single antenna or a multi-antenna transmit diversity, beamforming reduces interference received by a terminal device in a neighboring cell when the access network device 102 sends signals to the terminal devices 116 and 122 randomly distributed in related coverage.

At a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, or receive from another communications apparatus, or store in a memory) a particular quantity of data bits that need to be sent to the wireless communications receiving apparatus by using a channel. The data bits may be included in a transport block (or a plurality of transport blocks) of the data, and the transport block may be segmented to generate a plurality of code blocks.

In addition, the communications system 100 may be a PLMN network, a device-to-device (D2D) network, a machine-to-machine (M2M) network, an IoT network, or another network. FIG. 1 is merely a simplified schematic diagram of an example, and the network may further include another access network device not shown in FIG. 1.

The following describes in detail a processing object (to be specific, a MAC PDU) in embodiments of the present invention.

The MAC PDU is a data unit specified by a MAC layer protocol, and includes a byte stream that is byte (8 bits) aligned. When a multiple-byte stream is read, an order of from left to right and from top to bottom is used.

Figure 2:
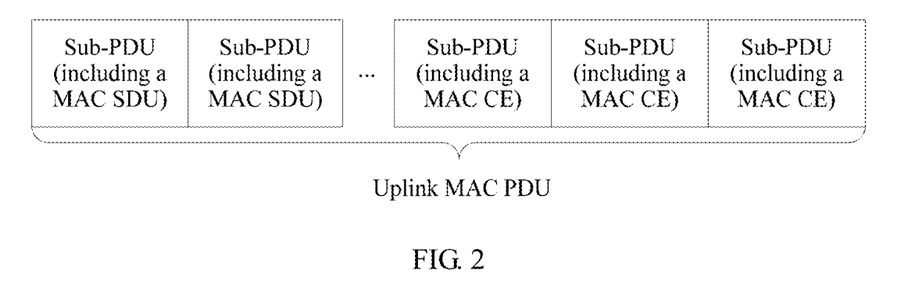
FIG. 2 is a schematic structural diagram of an uplink MAC PDU according to an embodiment of the present invention.
Figure 3:
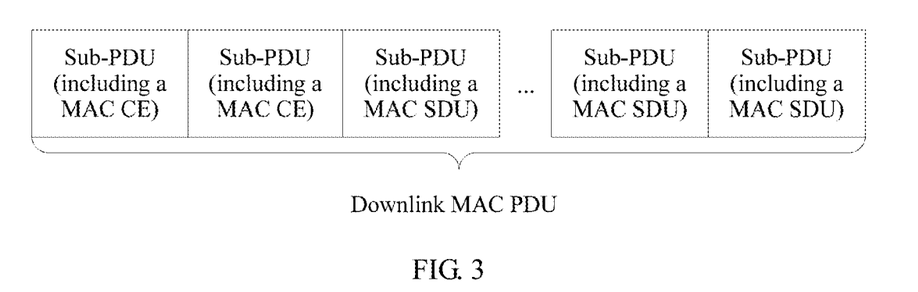
FIG. 3 is a schematic structural diagram of a downlink MAC PDU according to an embodiment of the present invention.

As shown in FIG. 2 or FIG. 3, in exemplary embodiments of the present invention, one MAC PDU may include one or more sub-protocol data units (sub-PDU). There may be the following types of sub-PDUs.

Type 1
One sub-PDU may include only one MAC subheader.
Type 2
One sub-PDU may include one MAC subheader and one MAC service data unit (SDU).
Type 3
One sub-PDU may include one MAC subheader and one MAC control element (CE).
Type 4
One sub-PDU may include one MAC subheader and padding.

As shown in FIG. 2, in an uplink MAC PDU (to be specific, a MAC PDU sent by a terminal device to a network device), a sub-PDU including a MAC CE is located after a sub-PDU including a MAC SDU.

As shown in FIG. 3, in a downlink MAC PDU (to be specific, a MAC PDU sent by a network device to a terminal device), a sub-PDU including a MAC CE is located before a sub-PDU including a MAC SDU.

The following describes in detail a structure of a MAC subheader. In exemplary embodiments of the present invention, the structure of the MAC subheader may be any one of the following.

Structure 1

Figure 4:
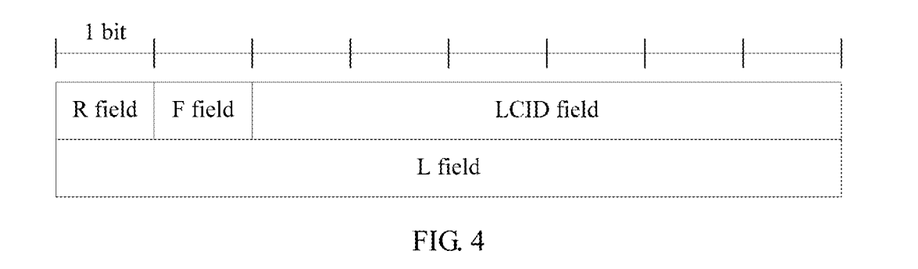
FIG. 4 is a schematic diagram of an example of a structure of a sub-PDU according to an embodiment of the present invention.

As shown in FIG. 4, in structure 1, a MAC subheader may include the following fields:

an R field, where a bit carried in the field is a reserved bit, and a length of the R field is 1 bit;

an F field, where a bit carried in the field is used to indicate a length of an L field, and a length of the F field is 1 bit;

the L field, where bits carried in the field are used to indicate a length of a MAC SDU or a MAC CE, and a length of the L field is 1 byte (8 bits); and an LCID field, where the field is used to carry an LCID, and a length of the LCID field is 6 bits.

Structure 2

Figure 5:
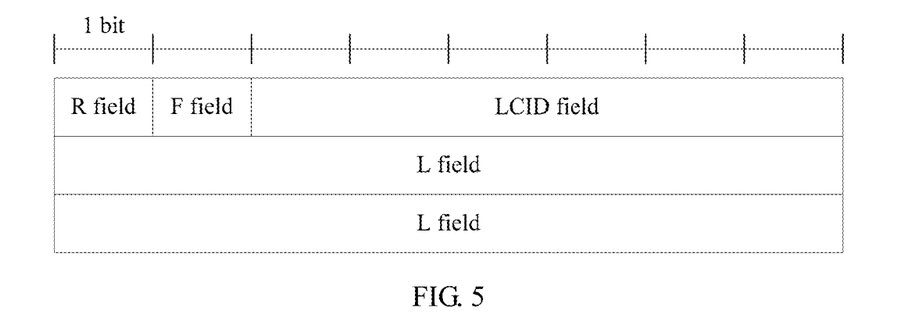
FIG. 5 is a schematic diagram of another example of a structure of a sub-PDU according to an embodiment of the present invention.

As shown in FIG. 5, in structure 2, a MAC subheader may include the following fields:

an R field, where a bit carried in the field is a reserved bit, and a length of the R field is 1 bit;

an F field, where a bit carried in the field is used to indicate a length of an L field, and a length of the F field is 1 bit;

the L field, where bits carried in the field are used to indicate a length of a MAC SDU or a MAC CE, and a length of the L field is 2 bytes (16 bits); and an LCID field, where the field is used to carry an LCID, and a length of the LCID field is 6 bits.

Structure 3

Figure 6:
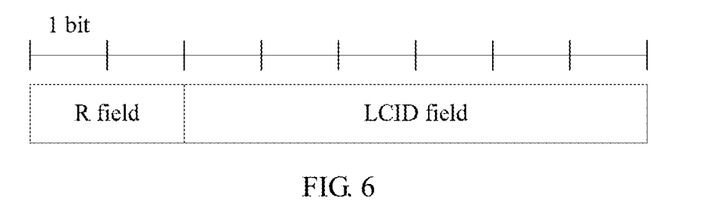
FIG. 6 is a schematic diagram of still another example of a structure of a sub-PDU according to an embodiment of the present invention.

As shown in FIG. 6, in structure 3, a MAC subheader may include the following fields:

an R field, where bits carried in the field are reserved bits, and a length of the R field is 2 bits; and an LCID field, where the field is used to carry an LCID, and a length of the LCID field is 6 bits.

It should be understood that the foregoing listed structures of the MAC subheader are merely described by way of example, and are not limitations with respect to the present invention. For example, the MAC subheader may further include an E field. A bit carried in the E field may be used to indicate whether the MAC subheader includes more subsequent fields.

In addition, the lengths (in other words, a quantity of occupied bits) of the fields are merely described by way of example, and are not limitations with respect to the present invention. The lengths may be changed in any way according to an actual requirement or a communications protocol requirement. For example, the length of the LCID field may be 5 bits.

In this embodiment of the present invention, assuming that the LCID field occupies K bits, there are $2^K$ possible values of the LCID, where K is a positive integer.

Some of the $2^K$ values of the LCID may be specified by the communications protocol as valid values having specified meanings. For example, an LCID having a valid value can uniquely indicate one logical channel. For another example, an LCID having a valid value can uniquely indicate one CE type. In this embodiment of the present invention, a communications device (for example, a network device or a terminal device) may parse a sub-PDU based on an LCID having a valid value. In other words, when a sub-PDU carries an LCID having a valid value, the communications device can successfully parse the sub-PDU. The other values in the $2^K$ values of LCID may be specified by the communications protocol as reserved values (or referred to as invalid values). LCIDs having reserved values have no meanings.

In this embodiment of the present invention, the communications device (for example, the network device and the terminal device) cannot parse a sub-PDU based on an LCID having an invalid value or a reserved value. In other words, when a sub-PDU carries an LCID having an invalid value or a reserved value, the communications device cannot successfully parse the sub-PDU.

It should be understood that the foregoing listed functions and usage of the LCID having a reserved value, the LCID having a valid value, and the LCID having an invalid value are merely described by way of example, and are not limitations with respect to the present invention. A person skilled in the art may change, in any way based on an actual requirement, the functions and usage of the LCIDs having various values.

Figure 7:
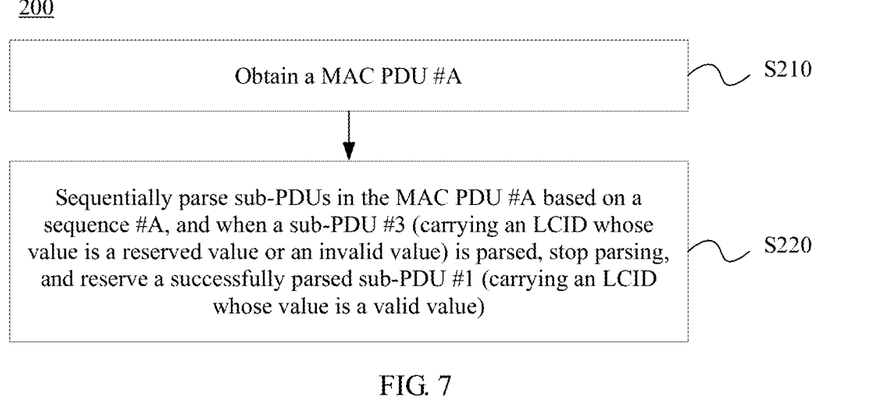
FIG. 7 is a schematic flowchart of an example of a MAC PDU parsing process according to an embodiment of the present invention.
Figure 8:
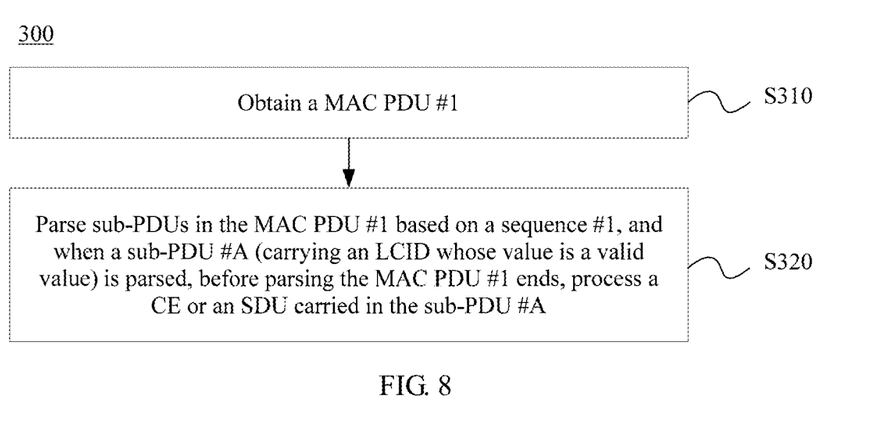
FIG. 8 is a schematic flowchart of another example of a MAC PDU parsing process according to an embodiment of the present invention.

The following describes in detail a MAC PDU parsing process in an embodiment of the present invention with reference to FIG. 7 and FIG. 8. FIG. 7 is a schematic flowchart of a MAC PDU processing method 200 according to an embodiment of the present invention. As shown in FIG. 7, in S210, a communications device #A (for example, a network device or a terminal device) may receive a data packet #A from a communications device #B (for example, a network device or a terminal device) through a physical layer (PHY) entity, and may decode the data packet #A on the PHY entity, to obtain a MAC PDU #A.

In this embodiment of the present invention, the MAC PDU #A includes N sub-PDUs, and a structure of each sub-PDU may be any one of structure 1 to structure 3. To avoid repetition, detailed descriptions are not repeated here. In addition, without loss of generality, it is assumed that an arrangement sequence of the N sub-PDUs in the MAC PDU #A is a sequence #A.

In S220, the communications device #A may sequentially parse the N sub-PDUs on a MAC layer entity based on the sequence #A. One sub-PDU (marked as a sub-PDU #1 without loss of generality) may be parsed based on an LCID carried in the sub-PDU #1. In addition, when parsing a sub-PDU fails, the communications device #A may perform the following processing. To be specific, if a value of an LCID carried in a sub-PDU (marked as a sub-PDU #3 without loss of generality) is an invalid value or a reserved value, the communications device #A cannot parse the sub-PDU #3 based on the LCID. In other words, parsing the sub-PDU #3 fails.

In this case, the communications device #A may stop parsing the MAC PDU #A. Specifically, the communications device #A may not parse a remaining sub-PDU in the MAC PDU #A. A "remaining" sub-PDU is a sub-PDU after the sub-PDU #3 in the MAC PDU #A in the sequence #A.

Optionally, after parsing the MAC PDU #A is stopped, the communications device #A may further discard one or more sub-PDUs (marked as a sub-PDU #4 below for the convenience of understanding and distinguishing) that are not parsed (or not successfully parsed) in the MAC PDU #A. Optionally, the one or more sub-PDUs #4 may include the sub-PDU #3. Optionally, the one or more sub-PDUs #4 may further include at least one sub-PDU #5. The at least one sub-PDU #5 is at least one sub-PDU after the sub-PDU #3 in the MAC PDU #A in the sequence #A. For example, the sub-PDU #5 represents all sub-PDUs after the sub-PDU #3 in the MAC PDU #A in the sequence #A.

In a Media Access Control protocol data unit processing method according to this application, the plurality of sub-PDUs in the MAC PDU are sequentially parsed, and when a sub-PDU carrying an LCID with an invalid value or a reserved value is processed, parsing the MAC PDU is stopped, and a successfully parsed sub-PDU is reserved, thereby avoiding that because a sub-PDU carrying an LCID with an invalid value or a reserved value cannot be parsed, an error occurs in parsing a subsequent sub-PDU, and ensuring that the successfully parsed sub-PDU can be used.

In this embodiment of the present invention, before the sub-PDU #3 is processed, there may be a plurality of successfully parsed sub-PDUs already. In addition, in this embodiment of the present invention, even though parsing the MAC PDU #A is stopped, the successfully parsed sub-PDUs are not discarded. In addition, when a sub-PDU is successfully parsed, the communications device #A may perform the following processing. To be specific, if a value of an LCID carried in a sub-PDU (marked as the sub-PDU #1 without loss of generality) is a valid value, the communications device #A can successfully parse out, based on the valid LCID, an SDU or a CE carried in the sub-PDU #1. Subsequently, the communications device #A may perform processing by using any one of the following manners.

Manner 1

In this embodiment of the present invention, if the sub-PDU #1 carries the SDU, after the communications device #A successfully parses out, on the MAC layer entity, the SDU carried in the sub-PDU #1, the communications device #A may store the SDU carried in the sub-PDU #1 into storage space of the MAC layer entity, and after the parsing the MAC PDU #A (or the N sub-PDUs) ends, send the obtained SDU to a higher layer entity (relative to a MAC layer) of the communications device #A.

Manner 2

In this embodiment of the present invention, if the sub-PDU #1 carries the SDU, after the communications device #A successfully parses out, on the MAC layer entity, the SDU carried in the sub-PDU #1, the communications device #A may send the SDU carried in the sub-PDU #1 to a higher layer entity (relative to a MAC layer) of the communications device #A. By way of example but not limitation, the higher layer entity may include but is not limited to a Radio Link Control (RLC) layer entity. It should be understood that the foregoing listed higher layer entity is merely described by way of example, and is not a limitation with respect to the present invention. For example, the higher layer entity may further include a Packet Data Convergence Protocol (PDCP) layer entity.

Optionally, in exemplary embodiments of the present invention, an opportunity of sending the SDU carried in the sub-PDU #1 to the higher layer entity may include any one of the following opportunities.

Opportunity 1

In this embodiment of the present invention, before parsing the MAC PDU #A ends, the communications device #A may send the SDU carried in the sub-PDU #1 to the higher layer entity. That "parsing the MAC PDU #A ends" may mean that all sub-PDUs in the MAC PDU #A are successfully parsed. Alternatively, that "parsing the MAC PDU #A ends" may mean that parsing a particular sub-PDU in the MAC PDU #A fails because the sub-PDU carries an LCID having an invalid value or a reserved value, and further, the communications device #A may stop parsing the MAC PDU #A. The process is described in detail subsequently.

Opportunity 2

In this embodiment of the present invention, before starting parsing the sub-PDU #2, the communications device #A may send the SDU carried in the sub-PDU #1 to the higher layer entity. The sub-PDU #2 may be a sub-PDU after the sub-PDU #1 in the MAC PDU #A in the sequence #A. By way of example but not limitation, the sub-PDU #2 may be the first sub-PDU after the sub-PDU #1 in the MAC PDU #A in the sequence #A. In manner 2 compared with manner 1, because the SDU is sent to the higher layer entity immediately after the SDU is parsed out, the SDU does not need to be stored into storage space of the MAC layer entity, thereby reducing overheads of the storage space.

Manner 3

In this embodiment of the present invention, if the sub-PDU #1 carries the CE, after the communications device #A successfully parses out, on the MAC layer entity, the CE carried in the sub-PDU #1, the communications device #A may store the CE carried in the sub-PDU #1 into storage space of the MAC layer entity, and after the parsing the MAC PDU #A (or the N sub-PDUs) ends, process obtained CEs in a centralized manner.

Manner 4

In this embodiment of the present invention, if the sub-PDU #1 carries the CE, after the communications device #A successfully parses out, on the MAC layer entity, the CE carried in the sub-PDU #1, the communications device can immediately process, on the MAC layer entity, the CE carried in the sub-PDU #1. An opportunity of processing the CE carried in the sub-PDU #1 may include the above opportunity 1 or opportunity 2. In manner 4 compared with manner 3, because the CE is processed immediately after the CE is parsed out, the CE does not need to be stored into the storage space of the MAC layer entity, thereby reducing overheads of the storage space.

FIG. 8 is a schematic flowchart of a MAC PDU processing method 300 according to an embodiment of the present invention. As shown in FIG. 8, in S310, a communications device #1 (for example, a network device or a terminal device) may receive a data packet #1 from a communications device #2 (for example, a network device or a terminal device) through a physical layer (PHY) entity, and may de-capsulate the data packet #1 on the PHY entity, to obtain a MAC PDU #1. In this embodiment of the present invention, the MAC PDU #1 includes N sub-PDUs, and a structure of each sub-PDU may be any one of structure 1 to structure 3. To avoid repetition, detailed descriptions are not repeated here. In addition, without loss of generality, it is assumed that an arrangement sequence of the N sub-PDUs in the MAC PDU #1 is a sequence #1.

In S320, the communications device #1 may sequentially parse the N sub-PDUs on a MAC layer entity based on the sequence #1. When a sub-PDU (marked as a sub-PDU #A without loss of generality) is successfully parsed, the communications device #1 may perform the following processing. To be specific, if a value of an LCID carried in a sub-PDU (marked as the sub-PDU #A without loss of generality) is a valid value, the communications device #1 can successfully parse out, based on the valid LCID, an SDU or a CE carried in the sub-PDU #A. For example, if the sub-PDU #A carries the SDU, after the communications device #1 successfully parses out, on the MAC layer entity, the SDU carried in the sub-PDU #A, the communications device #1 may send the SDU carried in the sub-PDU #A to a higher layer entity (relative to a MAC layer) of the communications device #1. By way of example but not limitation, the higher layer entity may include but is not limited to an RLC layer entity. It should be understood that the foregoing listed higher layer entity is merely described by way of example, and is not a limitation with respect to the present invention. For example, the higher layer entity may further include a PDCP layer entity.

Optionally, in exemplary embodiments of the present invention, an opportunity of sending the SDU carried in the sub-PDU #A to the higher layer entity may include any one of the following opportunities.

Opportunity 1

In this embodiment of the present invention, before parsing the MAC PDU #1 ends, the communications device #1 may send the SDU carried in the sub-PDU #A to the higher layer entity. That "parsing the MAC PDU #1 ends" may mean that all sub-PDUs in the MAC PDU #1 are successfully parsed. Alternatively, that "parsing the MAC PDU #1 ends" may mean that parsing a particular sub-PDU in the MAC PDU #1 fails because the sub-PDU carries an LCID having an invalid value or a reserved value, and further, the communications device #1 may stop parsing the MAC PDU #1. The process is described in detail subsequently.

Opportunity 2

In this embodiment of the present invention, before starting parsing a sub-PDU #B, the communications device #1 may send the SDU carried in the sub-PDU #A to the higher layer entity. The sub-PDU #B may be a sub-PDU after the sub-PDU #A in the MAC PDU #1 in the sequence #1. By way of example but not limitation, the sub-PDU #B may be the first sub-PDU after the sub-PDU #A in the MAC PDU #1 in the sequence #1.

For another example, in this embodiment of the present invention, if the sub-PDU #A carries the CE, after the communications device #1 successfully parses out, on the MAC layer entity, the CE carried in the sub-PDU #A, the communications device can immediately process, on the MAC layer entity, the CE carried in the sub-PDU #A. An opportunity of processing the CE carried in the sub-PDU #A may include the above opportunity 1 or opportunity 2.

In the MAC PDU processing method according to this application, the SDU or the CE does not need to be stored into storage space of the MAC layer entity, thereby reducing overheads of the storage space.

Optionally, when parsing a sub-PDU (marked as a sub-PDU #C without loss of generality) fails, the communications device #1 may perform the following processing. To be specific, if a value of an LCID carried in the sub-PDU #C is an invalid value or a reserved value, the communications device #1 cannot parse the sub-PDU #C based on the LCID. In other words, parsing the sub-PDU #C fails. In this case, the communications device #1 may stop parsing the MAC PDU #1. Specifically, the communications device #1 may not parse a remaining sub-PDU in the MAC PDU #1. The "remaining" sub-PDU is a sub-PDU after the sub-PDU #C in the MAC PDU #1 in the sequence #1.

Optionally, after parsing the MAC PDU #1 is stopped, the communications device #1 may further discard one or more sub-PDUs (marked as a sub-PDU #D below for the convenience of understanding and distinguishing) that are not parsed (or not successfully parsed) in the MAC PDU #1. Optionally, the one or more sub-PDUs #D may include the sub-PDU #C. Optionally, the one or more sub-PDUs #D may further include at least one sub-PDU #E. The at least one sub-PDU #E is at least one sub-PDU after the sub-PDU #C in the MAC PDU #1 in the sequence #1. For example, the sub-PDU #E may represent all sub-PDUs after the sub-PDU #C in the MAC PDU #1 in the sequence #1.

In a Media Access Control protocol data unit processing method according to this application, the plurality of sub-PDUs in the MAC PDU are sequentially parsed, and when a sub-PDU carrying an LCID with an invalid value or a reserved value is processed, parsing the MAC PDU is stopped, and a successfully parsed sub-PDU is reserved, thereby avoiding that because a sub-PDU carrying an LCID with an invalid value or a reserved value cannot be parsed, an error occurs in parsing a subsequent sub-PDU, and ensuring that the successfully parsed sub-PDU can be used.

Figure 9:
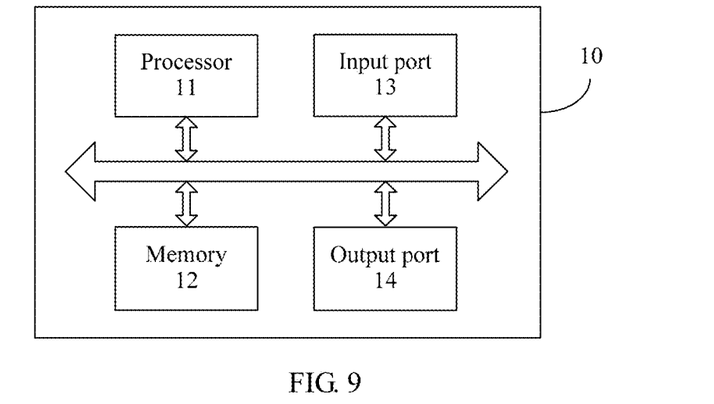
FIG. 9 is a schematic block diagram of an example of a MAC PDU processing apparatus according to an embodiment of the present invention.

According to the foregoing method, FIG. 9 is a schematic diagram of a Media Access Control protocol data unit processing apparatus 10 according to an embodiment of this application. As shown in FIG. 9, the apparatus 10 may be a communications device (for example, a network device or a terminal device), or may be a chip or a circuit, for example, a chip or a circuit that can be disposed in a communications device.

The apparatus 10 may include a processor 11 (an example of a processing unit) and a memory 12. The memory 12 is configured to store an instruction. The processor 11 is configured to execute the instruction stored in the memory 12, so that the apparatus 10 implements the steps of the method 200 corresponding to FIG. 2 or FIG. 7 or the method 300 corresponding to FIG. 8.

Further, the apparatus 10 may further include an input port 13 (an example of a communications unit) and an output port 14 (another example of the communications unit). Further, the processor 11, the memory 12, the input port 13, and the output port 14 may communicate with each other through an internal connection path, to transmit a control and/or data signal. The memory 12 is configured to store a computer program. The processor 11 may be configured to invoke the computer program from the memory 12 and run the computer program, to control the input port 13 to receive a signal, and control the output port 14 to send a signal, to implement the steps performed by the terminal device in the foregoing method. The memory 12 may be integrated into the processor 11, or the memory 12 and the processor 11 may be disposed separately.

Optionally, if the apparatus 10 is a communications device, the input port 13 may be a receiver, and the output port 14 may be a transmitter. The receiver and the transmitter may be a same physical entity or different physical entities. When the receiver and the transmitter are a same physical entity, the receiver and the transmitter may be collectively referred to as a transceiver. Optionally, if the apparatus 10 is a chip or a circuit, the input port 13 is an input interface, and the output port 14 is an output interface. Optionally, if the apparatus 10 is a chip or a circuit, the apparatus 10 may not include the memory 12. The processor 11 may read an instruction (a program or code) in a memory outside the chip, to implement the functions in the method 200 or 300.

In an implementation, functions of the input port 13 and the output port 14 may be implemented by using a transceiver circuit or a dedicated transceiver chip. The processor 11 may be implemented by using a dedicated processing chip, a processing circuit, a processor, or a universal chip.

In another implementation, the terminal device provided in this embodiment of this application may be implemented by using a general-purpose computer. In other words, program code for implementing the functions of the processor 11, the input port 13, and the output port 14 is stored in the memory 12, and a general-purpose processor executes the code in the memory 12 to implement the functions of the processor 11, the input port 13, and the output port 14.

The foregoing listed functions and actions of the modules or units in the communications apparatus 10 are merely described by way of example. The modules or units in the communications apparatus 10 may be configured to perform actions or processing processes performed by the communications device in the method 200 or the method 300. To avoid repetition, detailed descriptions are not repeated here.

For concepts, explanations, and detailed descriptions used by the apparatus 10 and related to technical solutions provided in this embodiment of this application and other steps, refer to the descriptions of the content in the foregoing method or other embodiments. Details are not repeated here.

Figure 10:
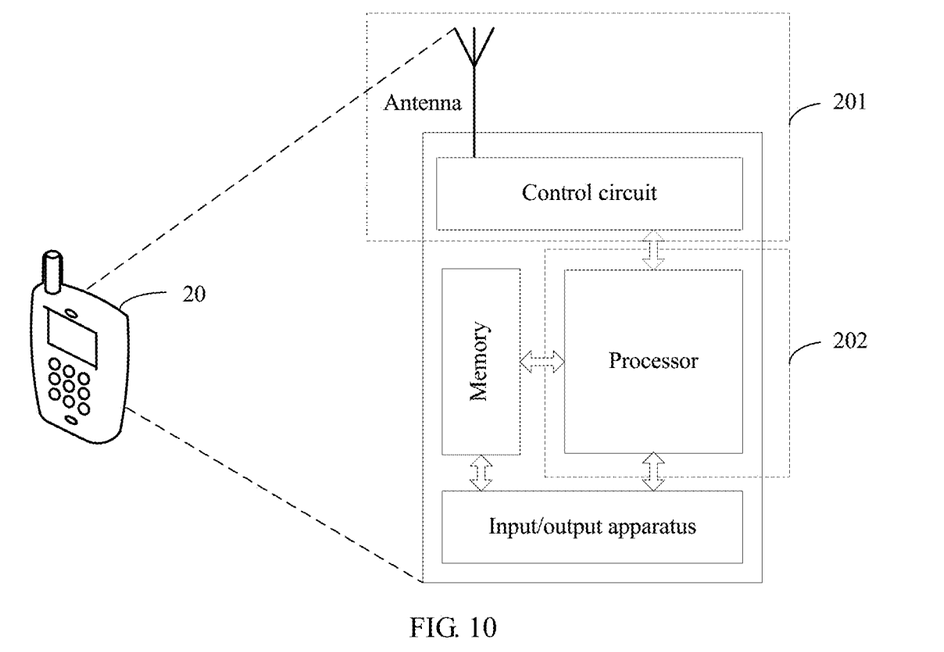
FIG. 10 is a schematic diagram of a terminal device according to an embodiment of the present invention.

FIG. 10 is a schematic structural diagram of a terminal device 20 according to this application. The terminal device 20 may be configured to implement the functions of the communications device in the method shown in FIG. 7 or FIG. 8. The terminal device 20 may be applied to the system shown in FIG. 1. For the convenience of description, FIG. 10 shows merely exemplary components of the terminal device. As shown in FIG. 10, the terminal device 20 includes a processor, a memory, a control circuit, an antenna, and an input/output apparatus.

The processor is configured to process a communications protocol and communication data, control the entire terminal device, execute a software program, and process data of the software program, for example, configured to support the terminal device in performing actions described in embodiments of a MAC PDU processing method. The memory is configured to store the software program and the data, for example, store the code described in the foregoing embodiments. The control circuit is configured to perform conversion between a baseband signal and a radio frequency signal and process the radio frequency signal. The control circuit and the antenna may be collectively referred to as a transceiver, and are configured to receive and send a radio frequency signal in a form of an electromagnetic wave. The input/output apparatus, for example, a touch screen, a display, or a keyboard, is configured to receive input data from a user and output data to the user.

After the terminal device is powered on, the processor may read the software program in a storage unit, explain and execute an instruction in the software program, and process the data of the software program. When data needs to be sent in a wireless manner, after performing baseband processing on the to-be-sent data, the processor outputs a baseband signal to a radio frequency circuit. The radio frequency circuit performs radio frequency processing on the baseband signal, and sends a radio frequency signal to the outside in a form of an electromagnetic wave through an antenna. When data is sent to the terminal device, the radio frequency circuit receives a radio frequency signal through an antenna, converts the radio frequency signal into a baseband signal, and outputs the baseband signal to the processor. The processor converts the baseband signal into the data, and processes the data.

A person skilled in the art may understand that for the convenience of description, FIG. 10 shows merely one memory and one processor. In an actual terminal device, there may be a plurality of processors and memories. The memory may be referred to as a storage medium, a storage device, or the like, and the number of processors or memories is not a limitation with respect to this application.

In an optional implementation, the processor may include a baseband processor and a central processing unit. The baseband processor is configured to process the communications protocol and the communication data. The central processing unit is configured to control the entire terminal device, execute the software program, and process the data of the software program. The processor in FIG. 9 integrates functions of the baseband processor and the central processing unit. A person skilled in the art may understand that the baseband processor and the central processing unit may be separate processors, which are interconnected by using a bus or another technology. A person skilled in the art may understand that the terminal device may include a plurality of baseband processors to adapt to different network standards, the terminal device may include a plurality of central processing units, to enhance a processing capability of the terminal device, and various parts of the terminal device may be connected by using various buses. The baseband processor may also be described as a baseband processing circuit or a baseband processing chip. The central processing unit may also be described as a central processing circuit or a central processing chip. Functions of processing the communications protocol and the communication data may be disposed inside the processor, or may be stored in a storage unit in a form of a software program, and the processor executes the software program to implement a baseband processing function.

For example, in this embodiment of this application, an antenna having a transceiving function and a control circuit may be considered as a transceiving unit 201 of the terminal device 20, and a processor having a processing function may be considered as a processing unit 202 of the terminal device 20. As shown in FIG. 8, the terminal device 20 includes the transceiving unit 201 and the processing unit 202. The transceiving unit may also be referred to as a transceiver, a transceiving apparatus, or the like. Optionally, a component configured to implement a receiving function in the transceiving unit 201 may be considered as a receiving unit, and a component configured to implement a sending function in the transceiving unit 201 may be considered as a sending unit. In other words, the transceiving unit 201 includes the receiving unit and the sending unit. For example, the receiving unit may also be referred to as a receiver, a receiver, a receiving circuit, and the like, and the sending unit may also be referred to as a transmitter, a transmitter, a transmit circuit, or the like.

Figure 11:
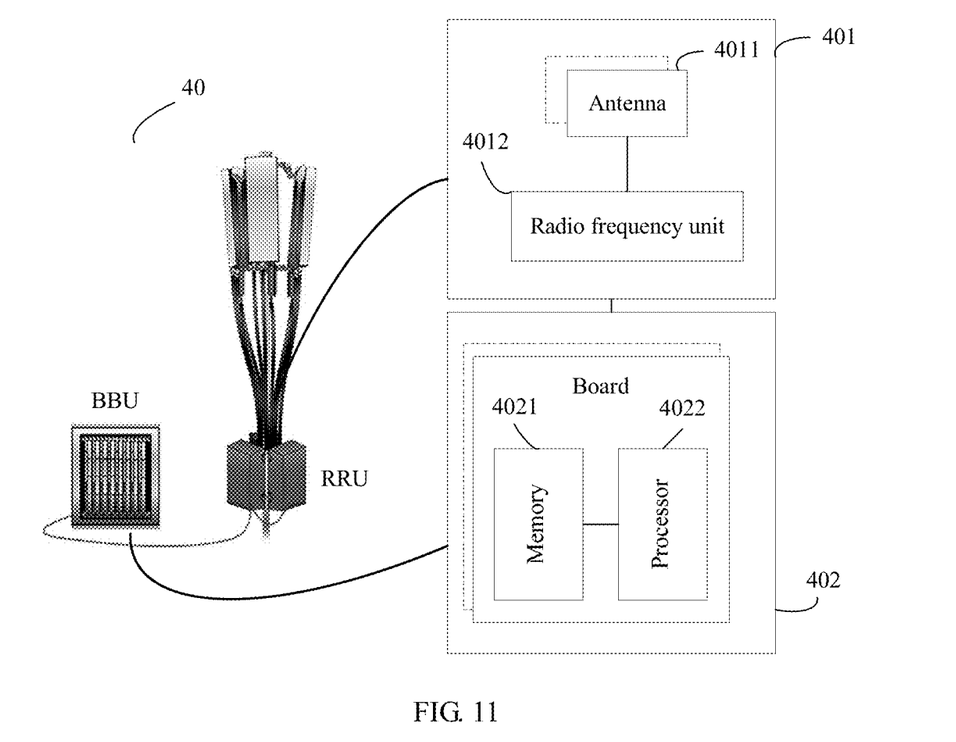
FIG. 11 is a schematic diagram of a network device according to an embodiment of the present invention.

FIG. 11 is a schematic structural diagram of a network device (for example, an access network device) according to an embodiment of this application. The network device may be configured to implement functions of the network device in the method shown in FIG. 7 or FIG. 8, for example, may be a schematic structural diagram of a base station. The network device (for example, the base station) may be applied to the system shown in FIG. 1. A network device 40 includes one or more radio frequency units, for example, a remote radio unit (RRU) 401 and one or more baseband units (BBUs) (which may also be referred to as a digital unit (DU)) 402. The RRU 401 may be referred to as a transceiving unit, a transceiver, a transceiving circuit, a transceiver, or the like, and may include at least one antenna 4011 and a radio frequency unit 4012. The RRU 401 is configured to receive and send a radio frequency signal and perform conversion between a radio frequency signal and a baseband signal, for example, configured to send a signaling message in the foregoing embodiments to a terminal device. The BBU 402 is configured to perform baseband processing, control a base station, and the like. The RRU 401 and the BBU 402 may be physically disposed together, or may be physically disposed separately, to be specific, may be a distributed base station.

The BBU 402 is a control center of the base station, may also be referred to as a processing unit, and is configured to implement a baseband processing function, for example, channel coding, multiplexing, modulation, and spreading. For example, the BBU (the processing unit) 402 may be configured to control the base station 40 to perform an operation procedure of the network device in method embodiments.

In an example, the BBU 402 may include one or more boards, and a plurality of boards may together support a radio access network (for example, an LTE system, or a 5G system) of a single access standard, or may separately support radio access networks of different access standards. The BBU 402 further includes a memory 4021 and a processor 4022. The memory 4021 is configured to store a necessary instruction and data. For example, the memory 4021 stores the code and the like in the foregoing embodiments. The processor 4022 is configured to control the base station to perform a necessary action, for example, configured to control the base station to perform an operation procedure of the network device in a method embodiment. The memory 4021 and the processor 4022 may serve one or more boards. In other words, a memory and a processor may be disposed on each board. Alternatively, a plurality of boards may share a same memory and a same processor. In addition, a further circuit may be further disposed on each board.

In a possible implementation, with the development of a system-on-chip (SoC) technology, all or some functions of the components 402 and 401 may be implemented by using the SoC technology, for example, implemented by using one base station function chip. The base station function chip integrates components such as a processor, a memory, and an antenna port. A program of a base-station-related function is stored in the memory. The processor executes the program to implement the base-station-related function. Optionally, the base station chip can read a memory outside the chip to implement the base-station-related function.

It should be understood that the structure of the network device shown in FIG. 11 is merely exemplary and does not constitute any limitation with respect to this application. In this application, a possibility that there may be a base station structure in another form in the future is not excluded.

According to a method in embodiments of this application, an embodiment of this application further provides a communications system, including the transmit end device and the receive end device.

It should be understood that, in embodiments of this application, the processor may be a central processing unit (CPU), or the processor may be another general purpose processor, a digital signal processor (DSP), an application specific integrated circuit (ASIC), a field-programmable gate array (FPGA) or another programmable logic device, a discrete gate or transistor logic device, a discrete hardware component, or the like. The general purpose processor may be a microprocessor or the processor may be any normal processor, or the like.

It should be further understood that, a memory in embodiments of this application may be a volatile memory or a nonvolatile memory, or may include a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. For example but not for limitation, many forms of random access memories (RAM)

are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or a part of a method in the foregoing embodiments may be implemented by using software, hardware, firmware, or any combination thereof. When a method is implemented by using software, all or a part of embodiments may be implemented in a form of a computer program product. The computer program product includes one or more computer instructions or computer programs. When the computer program instructions or the computer programs are loaded and executed on the computer, procedures or functions according to embodiments of this application are all or partially generated. The computer may be a general-purpose computer, a dedicated computer, a computer network, or another programmable apparatus. The computer instruction may be stored in a computer readable storage medium, or transmitted from one computer readable storage medium to another computer readable storage medium. For example, the computer instruction may be transmitted from one website, computer, server, or data center to another website, computer, server, or data center in a wired (for example, infrared, wireless, or microwave) manner. The computer readable storage medium may be any available medium accessible by a computer, or a data storage device such as a server or a data center including one or more available medium sets. The available medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not necessarily mean execution sequences in various embodiments of this application. The execution sequences of the processes should be determined according to functions and internal logic of the processes, and should not be construed as any limitation on implementation processes of embodiments of this application.

A person of ordinary skill in the art may be aware that, units and algorithm steps in examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of a system, apparatus, and unit, reference may be made to a corresponding process in method embodiments. Details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

For example, in embodiments of the present invention, the PHY layer entity and the MAC layer entity may be hardware, but more commonly exist as software, and run on the processor, to separately implement communication functions at the PHY layer and the MAC layer.

The units described as separate parts may or may not be physically separate, and parts displayed as units may or may not be physical units, may be located in one position, or may be distributed on a plurality of network units. Some or all of the units may be selected according to actual requirements to achieve objectives of solutions of embodiments. In addition, functional units in embodiments of this application may be integrated into one processing unit, or each of the units may exist alone physically, or two or more units are integrated into one unit. When the functions are implemented in a form of a software functional unit and sold or used as an independent product, the functions may be stored in a computer-readable storage medium. Based on such an understanding, technical solutions of this application may be implemented in a form of a software product. The software product is stored in a storage medium, and includes several instructions for instructing a computer device (which may be a personal computer, a server, or a network device) to perform all or some of the steps of methods described in embodiments of the present invention. The foregoing storage medium includes: any medium that can store program code, such as a Universal Serial Bus (USB) flash drive, a removable hard disk, a read-only memory, a random access memory, a magnetic disk, or an optical disc.

The foregoing description provides exemplary implementations of this application, but is not intended to limit the protection scope of this application. Any variation or replacement readily figured out by a person skilled in the art within the technical scope disclosed in this application may fall within the protection scope of this application.

Additionally, statements made herein characterizing the invention refer to an embodiment of the invention and not necessarily all embodiments.

What is claimed is:
1. A method, comprising:
   obtaining a media access control protocol data unit (MAC PDU), wherein the MAC PDU comprises N sub-PDUs, wherein N is a positive integer and each sub-PDU of the N sub-PDUs comprises a logical channel identifier (LCID);
   parsing the MAC PDU to obtain a first sub-PDU having an LCID with a reserved value; and
   discarding the first sub-PDU having the LCID with a reserved value and one or more remaining sub-PDUs located after the first sub-PDU having the LCID with a reserved value in the MAC PDU.

2. The method according to claim 1, further comprising:
in response to obtaining the first sub-PDU having the LCID with a reserved value, stopping the parsing.

3. The method according to claim 1, further comprising:
parsing the MAC PDU to obtain a parsed sub-PDU located before the first sub-PDU having the LCID with a reserved value, wherein the parsed sub-PDU comprises an LCID with a valid value; and
reserving the parsed sub-PDU.

4. The method according to claim 3, wherein the parsed sub-PDU comprises a MAC service data unit (SDU), and the method further comprises:
sending the MAC SDU to a higher layer entity relative to a MAC layer entity.

5. The method according to claim 4, wherein the MAC SDU is sent to the higher layer entity before a next sub-PDU is parsed, wherein the next sub-PDU is located after and adjacent to the sub-PDU which was parsed to obtain the MAC SDU.

6. The method according to claim 3, wherein the parsed sub-PDU comprises a MAC control element (CE), and the method further comprises:
processing the MAC CE on a MAC layer entity.

7. The method according to claim 6, wherein the MAC CE is processed before a next sub-PDU is parsed, wherein the next sub-PDU is located after and adjacent to the sub-PDU which was parsed to obtain the MAC CE.

8. The method according to claim 1, wherein the MAC PDU is an uplink MAC PDU and comprises M1 sub-PDUs and M2 sub-PDUs, each of the M1 sub-PDUs comprises a MAC control element (CE), each of the M2 sub-PDUs comprises a MAC service data unit (SDU), and the M1 sub-PDUs are located after the M2 sub-PDUs, wherein M1 and M2 are positive integers.

9. The method according to claim 1, wherein the MAC PDU is a downlink MAC PDU and comprises M1 sub-PDUs and M2 sub-PDUs, each of the M1 sub-PDUs comprises a MAC control element (CE), each of the M2 sub-PDUs comprises a MAC service data unit (SDU), and the M1 sub-PDUs are located before the M2 sub-PDUs, wherein M1 and M2 are positive integers.

10. An apparatus, comprising:
at least one processor; and
a non-transitory memory, coupled to the at least one processor, having processor-executable instructions stored thereon;
wherein the at least one processor is configured to execute the processor-executable instructions to cause the apparatus to perform the following:
obtaining a media access control protocol data unit (MAC PDU), wherein the MAC PDU comprises N sub-PDUs, wherein N is a positive integer and each sub-PDU of the N sub-PDUs comprises a logical channel identifier (LCID);
parsing the MAC PDU to obtain a first sub-PDU having an LCID with a reserved value; and
discarding the first sub-PDU having the LCID with a reserved value and one or more remaining sub-PDUs located after the first sub-PDU having the LCID with a reserved value in the MAC PDU.

11. The apparatus according to claim 10, wherein the at least one processor is further configured to execute the processor-executable instructions to cause the apparatus to perform the following:
in response to obtaining the first sub-PDU having the LCID with a reserved value, stopping the parsing.

12. The apparatus according to claim 10, wherein the at least one processor is further configured to execute the processor-executable instructions to cause the apparatus to perform the following:
parsing the MAC PDU to obtain a parsed sub-PDU located before the first sub-PDU having the LCID with a reserved value, wherein the parsed sub-PDU comprises an LCID with a valid value; and
reserving the parsed sub-PDU.

13. The apparatus according to claim 12, wherein the parsed sub-PDU comprises a MAC service data unit (SDU), and wherein the at least one processor is further configured to execute the processor-executable instructions to cause the apparatus to perform the following:
sending the MAC SDU to a higher layer entity relative to a MAC layer entity.

14. The apparatus according to claim 13, wherein the MAC SDU is sent to the higher layer entity before a next sub-PDU is parsed, wherein the next sub-PDU is located after and adjacent to the sub-PDU which was parsed to obtain the MAC SDU.

15. The apparatus according to claim 12, wherein the parsed sub-PDU comprises a MAC control element (CE), and wherein the at least one processor is further configured to execute the processor-executable instructions to cause the apparatus to perform the following:
processing the MAC CE on a MAC layer entity.

16. The apparatus according to claim 15, wherein the MAC CE is processed before a next sub-PDU is parsed, wherein the next sub-PDU is located after and adjacent to the sub-PDU which was parsed to obtain the MAC CE.

17. The apparatus according to claim 10, wherein each of the N sub-PDUs comprises a MAC subheader that comprises an LCID.

18. The apparatus according to claim 10, wherein the MAC PDU is an uplink MAC PDU and comprises M1 sub-PDUs and M2 sub-PDUs, each of the M1 sub-PDUs comprises a MAC control element (CE), each of the M2 sub-PDUs comprises a MAC service data unit (SDU), and the M1 sub-PDUs are located after the M2 sub-PDUs, wherein M1 and M2 are positive integers.

19. The apparatus according to claim 10, wherein the MAC PDU is a downlink MAC PDU and comprises M1 sub-PDUs and M2 sub-PDUs, each of the M1 sub-PDUs comprises a MAC control element (CE), each of the M2 sub-PDUs comprises a MAC service data unit (SDU), and the M1 sub-PDUs are located before the M2 sub-PDUs, wherein M1 and M2 are positive integers.

20. Anon-transitory computer-readable storage medium having processor-executable instructions stored thereon, wherein the processor-executable instructions, when executed by a processor, facilitate:
obtaining a media access control protocol data unit (MAC PDU), wherein the MAC PDU comprises N sub-PDUs, wherein N is a positive integer and each sub-PDU of the N sub-PDUs comprises a logical channel identifier (LCID);
parsing the MAC PDU to obtain a first sub-PDU having an LCID with a reserved value; and
discarding the first sub-PDU having the LCID with a reserved value and one or more remaining sub-PDUs located after the first sub-PDU having the LCID with a reserved value in the MAC PDU.

* * * * *

UNITED STATES PATENT AND TRADEMARK OFFICE
CERTIFICATE OF CORRECTION

| | |
|---|---|
| PATENT NO. | : 11,477,307 B2 |
| APPLICATION NO. | : 16/876953 |
| DATED | : October 18, 2022 |
| INVENTOR(S) | : Liu et al. |

It is certified that error appears in the above-identified patent and that said Letters Patent is hereby corrected as shown below:

In the Claims

Claim 20: Column 22, Line 51: "Anon-transitory computer-readable storage medium" should read -- A non-transitory computer-readable storage medium --.

Signed and Sealed this
Seventh Day of March, 2023

Katherine Kelly Vidal
*Director of the United States Patent and Trademark Office*